Oct. 22, 1963   A. E. LE VAN ETAL   3,107,533
INDICATOR
Filed July 29, 1959
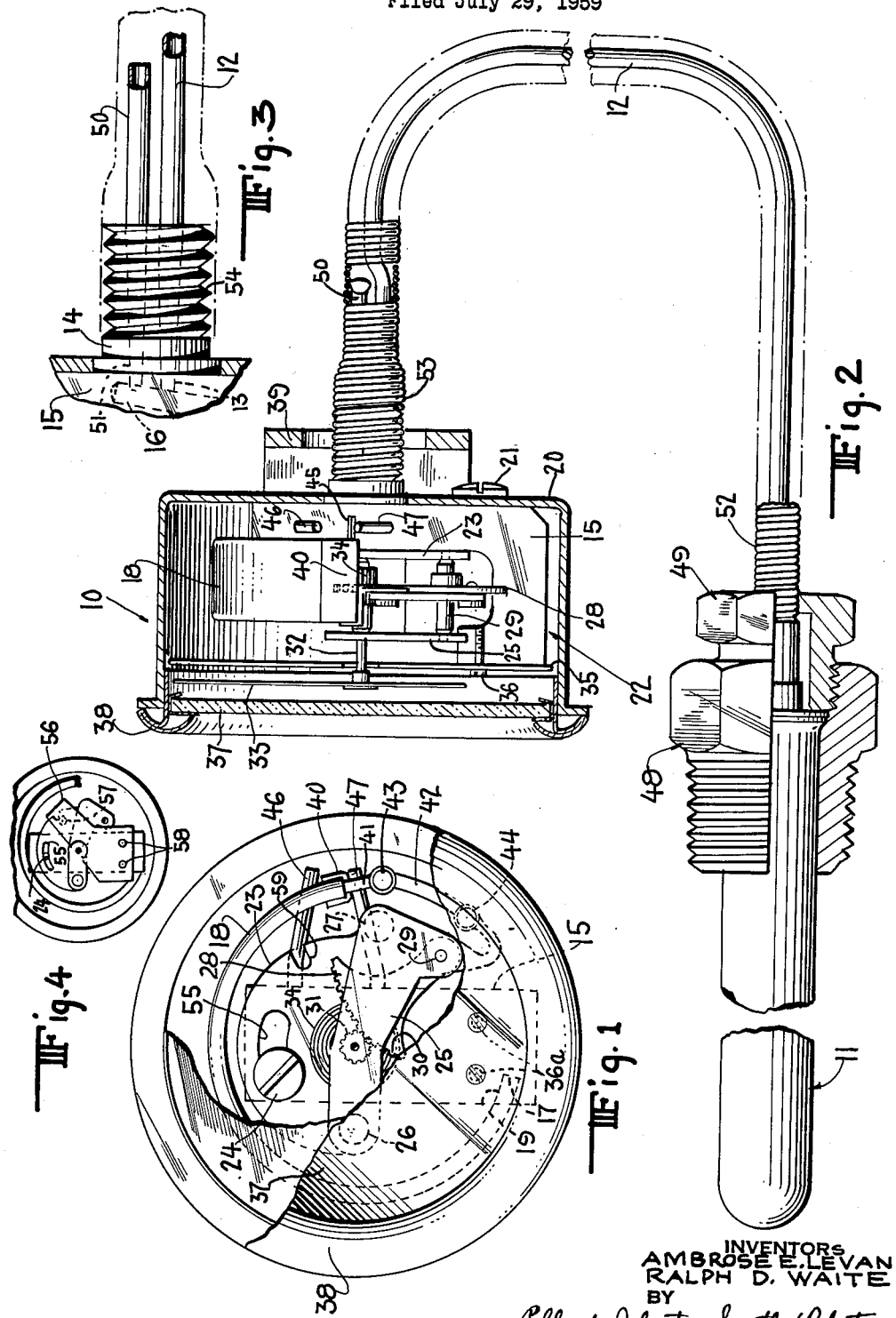
INVENTORS
AMBROSE E. LEVAN
RALPH D. WAITE
BY
Pollard, Johnston, Smythe & Robertson
ATTORNEYS സ
United States Patent Office 3,107,533
Patented Oct. 22, 1963

3,107,533
INDICATOR
Ambrose E. Le Van and Ralph D. Waite, Sellersville, Pa.,
assignors to Ametek, Inc., a corporation of Delaware
Filed July 29, 1959, Ser. No. 830,286
1 Claim. (Cl. 73—368.4)

This invention relates to a temperature indicating device, and particularly to temperature indicating devices employing a capillary tube containing a temperature responsive fluid.

In previously used temperature indicating devices employing a temperature responsive fluid, the fluid is introduced into the instrument by means of a filling tube located within the instrument case. Since the filling tube is located within the case, the fluid has to be admitted when the instrument is disassembled. Furthermore, for different temperature ranges, the fluid may be introduced at different pressures under room conditions. This requires different positions of the instrument movement for each different range of temperature, since the pressure responsive element within the indicator will assume a different position for each pressure. Consequently, setting of the movement also has to be performed with the instrument disassembled. Only after setting the movement, introducing the fluid and sealing the filling tube can the assembly of the instrument be completed. The requirement of setting and filling the instrument in a disassembled state requires that the assembly operations be interrupted. This leads to difficult handling of the device during production and to inefficient assembly techniques.

One of the objects of the invention is to provide a temperature indicating device which may be simply filled with a temperature responsive fluid after the device is assembled.

A further object of the invention is to provide a temperature indicating device in which the movement may be simply and accurately positioned for each of the temperature ranges to be accommodated.

In one aspect, the invention contemplates a thermometer having a housing containing an indicating means. A tube is provided to connect a bulb located remote from the housing to the indicating means. An additional tube extending into the housing from the outside enables the temperature responsive fluid to be introduced into the indicating means, the tube, and the bulb while the thermometer is in an assembled condition.

In another aspect, the invention contemplates a thermometer having a housing containing a movement actuated by a pressure responsive means. A tube is provided to connect a remotely located bulb to the pressure responsive means. By means of a filling tube extending from without the housing into its interior, the temperature responsive fluid may be introduced into the thermometer. The movement is provided with index means to enable the movement to be properly positioned with respect to the pressure responsive means for each temperature range.

These and other objects, advantages and features of the invention will become apparent from the following description and drawing which is merely exemplary.

In the drawing:

FIG. 1 is a front elevational view of the thermometer with parts broken away;

FIG. 2 is a side elevational sectional view of the thermometer, capillary tube, and bulb;

FIG. 3 is a fragmentary side elevational view of the thermometer socket, tube, and filling tube; and FIG. 4 is a front elevational view of the thermometer with a schematic representation of the adjusting fixture in place.

The sensing element for thermometer 10 (FIG. 2) consists of a temperature responsive fluid contained in bulb 11 and capillary tube 12. Capillary tube 12 is connected to passage 13 (FIG. 3) in connector 14 of socket 15. Passage 13 is connected to internal passage 16 within socket 15 near one of the ends of the passage. The open end 17 of Bourdon tube 18 which is mounted in slot 19 of socket 15 is connected to internal passage 16 which extends through socket 15 to slot 19.

Upon the occurrence of a temperature change at bulb 11, the temperature responsive fluid within bulb 11 and capillary tube 12 will experience a physical change. With increasing temperature at bulb 11, the pressure within bulb 11 and capillary tube 12 will increase and cause an outward deflection of Bourdon tube 18.

Socket 15 is mounted within case 20 by means of screws 21. Socket 15 serves to support thermometer movement 22 which includes bottom plate 23, mounted upon socket 15 by means of screw 24. Thermometer movement assembly 22 includes bottom plate 23 and is positioned between bottom plate 23 and top plate 25 which is spaced from bottom plate 23 by means of columns 26 and 27. Segment 28 of the movement assembly is pivotally mounted on arbor 29 which is supported by bottom plate 23 and top plate 25. Gear teeth 30 of segment 28 mesh with the teeth of pinion 31 of the movement assembly which is pivotally mounted in bottom plate 23 and top plate 25. Extension 32 of pinion 31 carries pointer 33. Pinion 31 is biased in a torsional manner by hairspring 34. Dial 35 of thermometer 10, which is attached to socket 15 by means of screws 36, is covered by window 37 retained in case 20 by ring 38. Case 20 may be mounted in an instrument panel or other structure by means of clamp 39.

The free end of Bourdon tube 18 is connected to tip 40. Bracket 41 attached to tip 40 is pivotally connected to segment 28 by link 42 and rivet or connector 44. The travel of the free end of Bourdon tube 18 is limited by stud 45 which projects between stops 46 and 47.

Movement of Bourdon tube 18 in response to temperature changes at bulb 11 is transmitted to link 42 and segment 28. Segment 28 is thereby rotated on arbor 29 and causes the rotation of pinion 31, extension 32, and pointer 33.

Bulb 11 is supported by union 48 which may be installed in the wall of a container or housing in which the temperature is to be sensed. Bulb 11 and capillary tube 12 are held with respect to union 48 by the tightening action of bushing 49.

In order to fill the system with the temperature responsive fluid, filling tube 50 is provided. Filling tube 50 is connected to filling passage 51 (FIG. 3) which extends through connector 14 and intersects internal passage 16 proximate to its junction with passage 13. It is evident that by introducing the temperature responsive fluid into the open end of filling tube 50, the fluid may enter into Bourdon tube 18 by means of internal passage 16 and also into capillary tube 12 by means of passage 13. After filling the system, the open end of filling tube 50 is sealed. The length of capillary tube 12 extending from bulb 11 to the region of the free end of filling tube 50 is protected from damage by being encased in flexible spiral armor 52. Filling tube 50 and the portion of capillary tube 12 extending alongside it toward thermometer 10 are both encased by armor member 52. Armor member 52 may be provided at one end with a portion 53 having an inside diameter compatible with external thread 54 of connector 14 so that the armor member may be screwed onto it. Armor member 52 has sufficient length to cover the free end of filling tube 50 and also the capillary tube 12.

It is intended that thermometer 10 be completely assembled and sealed before the temperature responsive fluid is admitted to the system. Upon assembling thermometer 10, it is necessary to properly locate thermometer movement assembly 22 with respect to socket 15 so that movement 22 can respond to the entire motion of Bourdon tube 18 over its complete range. Thermometer movement 22 is positioned with respect to socket 15 by means of screw 24 passing through slot 55 in plate 23. As indicated in FIG. 4, the initial positioning of thermometer movement 22 may be accomplished with the aid of fixture 56. Fixture 56 comprises a plate to which is attached locating pin 57. Fixture 56 is also provided with threaded pins 58 spaced so as to engage with the holes 36a for screws 36 in socket 15. Fixture 56 is designed in such a manner that when it is mounted on socket 15 by means of threaded pins 58, locating pin 57 will pass within locating notch 59 in the periphery of bottom plate 23 if movement 22 is correctly positioned on socket 15. With this alignment established, screw 24 passing through slot 55 may be tightened to lock movement 22 into permanent position. The fixture 56 then can be renewed. In thermometers for various ranges of temperature, the free end of Bourdon tube 18 in each thermometer has a different initial position with respect to socket 15. Consequently, a different setting of movement 22 is required for each temperature range so that said free end will be properly located for that range thereby properly relating the tube tip or free end and the movement. Slot 55 permits thermometer movement 22 to be positioned as required for each of the temperature ranges. For each temperature range, a particular form of fixture 56 is required.

It should be understood that variations can be made in the details of construction without departing from the spirit of the invention, except as defined in the appended claim.

What is claimed is:

In a device responsive to temperature changes at a particular location, the combination including a housing, pressure responsive means, socket means for supporting said pressure responsive means within said housing, movement means actuated by said pressure responsive means, said movement means including a segment and pinion, said segment being connected to said pressure responsive means, means for supporting said movement means within said housing on said socket means, index means for positioning said movement means with respect to said socket means and said pressure responsive means for selective temperature ranges so as to position said movement means relative to said pressure responsive means to adjust for the particular temperature range, bulb means at said particular location, a tube extending into said housing and connecting said bulb means to said pressure responsive means, temperature responsive fluid disposed within said bulb means, tube and pressure responsive means, said pressure responsive means being actuated by the response of said fluid to a change in temperature at said bulb means, and an additional tube extending into said housing from the exterior of said housing and being connected to said pressure responsive means within said housing, said additional tube being sealed at its exterior end after said temperature responsive fluid is introduced through said additional tube to fill said pressure responsive means, tube and bulb means.

References Cited in the file of this patent

UNITED STATES PATENTS

| | | |
|---|---|---|
| 1,294,846 | Strzyczkowski | Feb. 18, 1919 |
| 1,893,388 | Bayer | Jan. 3, 1933 |
| 2,247,102 | Sugden et al. | June 24, 1941 |
| 2,386,164 | Hurley | Oct. 2, 1945 |
| 2,732,716 | Smith | Jan. 31, 1956 |
| 2,908,184 | Matchett | Oct. 13, 1959 |

FOREIGN PATENTS

| | | |
|---|---|---|
| 600,471 | France | Feb. 8, 1926 |
| 738,736 | Great Britain | Oct. 19, 1955 |